United States Patent Office 2,802,881
Patented Aug. 13, 1957

2,802,881
HALO-DICYCLOHEXYL-PHENOLS

Herbert B. Rickert, Midland, Mich., assignor to The Dow Chemical Company, Midland, Mich., a corporation of Delaware No Drawing. Application May 11, 1955,
Serial No. 507,745

3 Claims. (Cl. 260—619)

The present invention is concerned with the 4-halo-2,6-dicyclohexyl-phenols of the following formula

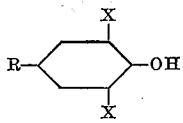

wherein X represents cyclohexyl and R represents bromine or chlorine. These novel compounds are a viscous liquid and a crystalline solid which are somewhat soluble in many organic solvents and of very low solubility in water. They have been found to be particularly valuable as parasiticides and are adapted to be employed as active toxic constituents of compositions for the control of many common agricultural pests.

The new 4-halo-2,6-dicyclohexyl-phenols may be prepared by several methods. In one method of preparing the compounds, cyclohexene, or other source material capable of yielding cyclohexene, is mixed or blended with 4-chloro-2-cyclohexyl-phenol or 4-bromo-2-cyclohexyl-phenol. This operation is carried out in the presence of a condensation catalyst such as hydrochloric acid, sulfuric acid, phosphoric acid, zinc chloride, aluminum chloride, acid-activated clay or a cation exchange resin in the acid form. Good results are obtained when an amount of catalyst is employed equal to from about 1 to 10 percent by weight of the employed 4-halo-2-cyclohexyl-phenol reagent. The amounts of the cyclohexene and 4-halo-2-cyclohexyl-phenol to be employed are not critical, some of the desired product being produced with any proportion of ingredients. In general, optimum yields are obtained when employing substantially equimolecular proportions of the reagents. The reaction takes place smoothly at the temperature range of from 130° to 200° C. Temperatures substantially below 130° C. materially affect the course of the reaction and should not be employed for appreciable periods of time if it is desired to obtain the 4-halo-2,6-dicyclohexyl-phenol as a major product of reaction.

In an alternative method the new compounds may be prepared by halogenating a 2,6-dicyclohexyl-phenol whereby halogen is substituted in a position para to the hydroxyl group. The halogenation may be carried out in an inert organic solvent such as carbon tetrachloride. The amount of 2,6-dicyclohexyl-phenol and halogenating agent such as chlorine or bromine to be employed is not critical, some of the desired product being produced with any proportion of reagents. In general, optimum yields are obtained when employing equivalent proportions of the dicyclohexyl-phenol and halogenating agent. The employment of an excess of the halogenating agent does not have an adverse affect upon the reaction, but is undesirable from the standpoint of economy. The reaction between the 2,6-dicyclohexyl-phenol and halogenating agent is somewhat exothermic and takes place readily at temperatures of from 10° to 40° C. The temperature may be controlled by regulating the rate of contacting the reactants and by external cooling. Upon completion of the reaction of the 4-halo-2-cyclohexyl-phenol with the cyclohexene or the 2,6-dicyclohexyl-phenol with the halogenating agent, the reaction mixture may be treated in conventional fashion to separate the desired product, i. e. filtration, washing with water, washing with dilute aqueous caustic, decantation and fractional distillation under reduced pressure.

The following examples illustrate the invention but are not to be construed as limiting:

Example 1

1545 grams (7.34 moles) of 4-chloro-2-cyclohexyl-phenol, 100 grams of a sulfuric acid-activated bentonite (Retrol clay) and 15 milliliters of sulfuric acid were charged into a flask and a mixture of 734 grams (7.34 moles) of cyclohexanol (equivalent to 7.34 moles of cyclohexene) added portionwise thereto with stirring and at a temperature of from 162° to 167° C. The addition was carried out over a period of about 2.5 hours and with continuous distillation of formed cyclohexene and water, separation of the water and recycling of the cyclohexene. Following the addition, the mixture was maintained at a temperature of from 160° to 163° C. for about 0.5 hour to complete the reaction. The reaction mixture was then cooled to 100° C., filtered and the filtrate successively washed with dilute aqueous sodium hydroxide and water. The washed product was then diluted with 20 milliliters of aqueous 10 percent sodium hydroxide and the resulting mixture fractionally distilled under reduced pressure to separate a 4-chloro-2,6-dicyclohexyl-phenol product as a viscous liquid boiling at 176° to 179.5° C. at 1.1 millimeters pressure.

Example 2

1791 grams (8.5 moles) of 4-chloro-2-cyclohexyl-phenol, 110 grams of Retrol clay and 17 milliliters of sulfuric acid were charged into a flask and a mixture comprising 850 grams of cyclohexanol and 17 milliliters of sulfuric acid added portionwise thereto with stirring and at a temperature of from 165° to 181° C. The addition was carried out over a period of about 3.5 hours and with continuous distillation of formed cyclohexene and water, separation of the water, and recycling of the cyclohexene. Following the addition, the mixture was maintained at a temperature of from 171° to 180° C. for about 0.5 hour to complete the reaction. The reaction mixture was thereafter cooled to room temperature, filtered and the filtrate successively washed with dilute aqueous sodium hydroxide and warm water. The washed filtrate was then fractionally distilled under reduced pressure to separate a 4-chloro-2,6-dicyclohexyl-phenol product.

Example 3

107 grams (0.39 mole) of 2,6-dicyclohexyl-phenol was dissolved in 100 milliliters of carbon tetrachloride and the resulting mixture placed in a flask equipped with a stirrer. 65.5 grams (0.41 mole) of bromine was then added portionwise to the above mixture over a period of 16 minutes. The latter operation was carried out with stirring and at a temperature of from 16° to 23° C. Following the addition, the mixture was maintained with stirring at a temperature of 16° C. for about one hour to complete the reaction. The reaction mixture was then blown with air for two hours to remove hydrogen bromide and thereafter successively washed with dilute aqueous sodium hydroxide and water. The washed mixture was then diluted with 5 milliliters of aqueous 10 percent sodium hydroxide and the latter product fractionally distilled under reduced pressure to separate a 4-bromo-2,6-dicyclohexyl-phenol product as a viscous liquid boiling at 174°–178° C. at 0.3 millimeter pressure. This product had a hydrogen content of 7.31, a carbon content of 64.35 and a bromine content of 23.7 percent.

Example 4

1684 grams (8 moles) of 4-chloro-2-cyclohexyl-phenol and 164 grams of aluminum chloride were charged into a flask and 722 grams (8.8 moles) of cyclohexene added portionwise thereto with stirring and at a temperature of from 136° to 149° C. The addition was carried out over a period of about 1.5 hours and at a temperature of from 136° to 149° C. The reaction mixture was then cooled to room temperature and a portion thereof diluted with carbon tetrachloride. A portion of the diluted mixture was then successively washed with aqueous 50 percent hydrochloric acid and aqueous 30 percent sodium hydroxide. The remaining portion of the diluted mixture was treated in a similar manner and the washed products combined. Fractional distillation of the combined product under reduced pressure yielded a 4-chloro-2,6-dicyclohexyl-phenol product boiling at 210° to 211.5° C. at 3 millimeters pressure.

The products of the preceding examples are adapted to be applied to plant foliage for the control of plant pests such as Southern army worms and Mexican bean beetles. In operations against Southern army worms, applications to plant foliage of aqueous compositions containing one pound of the toxicants per 100 gallons of ultimate mixture give 100 percent controls of this organism.

I claim:

1. A compound of the group consisting of 4-chloro-2,6-dicyclohexyl-phenol and 4-bromo-2,6-dicyclohexyl-phenol.
2. 4-chloro-2,6-dicyclohexyl-phenol.
3. 4-bromo-2,6-dicyclohexyl-phenol.

References Cited in the file of this patent

UNITED STATES PATENTS 2,221,809    Mills _____ Nov. 19, 1940

OTHER REFERENCES

Skraup et al.: Berichte Deut. Chem., vol. 60B (1927), pp. 1070–4 (5 pages).

Klarmann et al.: Jour. Amer. Chem. Soc., vol. 55 (1933), pp. 2576–89 (14 pages).